(12) United States Patent
Ballin et al.

(10) Patent No.: US 7,742,901 B2
(45) Date of Patent: Jun. 22, 2010

(54) METHOD AND SYSTEM FOR VIRTUAL OBJECT GENERATION

(75) Inventors: Daniel Ballin, Ipswich (GB); Marco Gillies, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 10/525,339

(22) PCT Filed: Aug. 7, 2003

(86) PCT No.: PCT/GB03/03460

§ 371 (c)(1),
(2), (4) Date: Feb. 22, 2005

(87) PCT Pub. No.: WO2004/019281

PCT Pub. Date: Mar. 4, 2004

(65) Prior Publication Data

US 2006/0129360 A1    Jun. 15, 2006

(30) Foreign Application Priority Data

Aug. 22, 2002    (GB) ................................ 0219623.6

(51) Int. Cl.
G06F 7/60        (2006.01)
G06T 15/00       (2006.01)
(52) U.S. Cl. .......................................... 703/2; 345/419
(58) Field of Classification Search .................... 703/2; 345/420, 473, 474, 419
See application file for complete search history.

(56) References Cited

U.S. PATENT DOCUMENTS 4,905,162 A    2/1990    Hartzband et al.
6,094,202 A    7/2000    Rouet et al.

(Continued)

FOREIGN PATENT DOCUMENTS

EP    1 039 417    9/2000

(Continued)

OTHER PUBLICATIONS

GB Search Report.

(Continued)

Primary Examiner—Paul L Rodriguez
Assistant Examiner—Eunhee Kim
(74) Attorney, Agent, or Firm—Nixon & Vanderhye P.C.

(57) ABSTRACT

An object model of a first type such as an avatar is analyzed, and an object model of a second type, such as a clothing model, is generated. The object model of the first type is analyzed by comparing it to a set of pre-defined object models of the same type and deriving a set of weight values which when used as coefficients in a summation of the predefined object models result in an approximation to the input object model. The derived set of weight values can then be used to sum together a set of predefined object models of a second type to give a new predefined object model of a second type which corresponds to the input object model of the first type. Preferably, the input object model is a user avatar, and the output object model is a virtual item of clothing. The user avatar may then be displayed to a user 'wearing' the generated item of clothing.

7 Claims, 8 Drawing Sheets

U.S. PATENT DOCUMENTS

| | | | |
|---|---|---|---|
| 6,163,322 | A | 12/2000 | LaChapelle |
| 6,310,627 | B1 * | 10/2001 | Sakaguchi .................. 345/630 |
| 6,345,109 | B1 | 2/2002 | Souma et al. |
| 2001/0026272 | A1 | 10/2001 | Feld et al. |
| 2002/0097380 | A1 | 7/2002 | Moulton et al. |
| 2002/0107762 | A1 * | 8/2002 | Kunigita ...................... 705/27 |
| 2002/0140732 | A1 * | 10/2002 | Tveskov ..................... 345/763 |
| 2003/0128205 | A1 * | 7/2003 | Varghese .................... 345/419 |

FOREIGN PATENT DOCUMENTS

| | | |
|---|---|---|
| WO | WO 99/57900 | 11/1999 |
| WO | WO 01/08102 | 2/2001 |
| WO | WO 01/69528 | 9/2001 |

OTHER PUBLICATIONS

PCT International Search Report.

Darrell, Trevor, "Rendering Articulated Figures from Examples," Multi-View Modeling and Analysis of Visual Scenes, IEEE Comput. Soc., Jun. 1999, pp. 65-72.

* cited by examiner

METHOD AND SYSTEM FOR VIRTUAL OBJECT GENERATION

This application is the US national phase of international application PCT/GB2003/003460 filed 7 Aug. 2003 which designated the U.S. and claims benefit of GB 0219623.6, dated 22 Aug. 2002, the entire content of which is hereby incorporated by reference.

BACKGROUND

1. Technical Field

This invention relates to a method and system for analysing and/or generating object models, and in particular to generating object models of a second type using object models of a first type.

2. Related Art

It is known that virtual object models of human bodies can be created, which provide for a human body representation in a computer-generated, virtual space. The models of such "virtual humans" are commonly referred to in the art as "avatars".

One increasingly popular touted use of avatars is to have them model clothes on-line for use in on-line shopping applications. One problem is that for clothes to hang realistically on an avatar the computer needs to do very expensive cloth dynamics calculations. Cloth dynamics is slow and processor intensive, and is therefore not suitable for consumer-end computers or mobile devices.

Cloth dynamics methods are based on a physical simulation of the motion and properties of the cloth. Clothes are fitted by finding a physically stable configuration of the cloth. In D. Terzopoulos, J. C. Platt and H. Barr, (1987) *Elastically Deformable Models, Computer Graphics* (SIGGRAPH '97 proceedings), Addison-Wesley, 21, pp 205-214, 1987 there is presented a method based on treating the cloth as a continuous surface and expressing motion of an infinitesimal element of that surface as Lagrange equations. J. W. Eischen, S. Deng and T. G. Clapp (1996) in *Finite-Element Modelling and control of Flexible Fabric Parts*, Computer Graphics in Textiles and Apparel (IEEE Computer Graphics and Applications) pp 71-80, September 1996 use finite elements to model cloth, however, this method is unfeasibly expensive in terms of computational power. D. E. Breen, D. H. House and M. J. Wozny (1994), *Predicting the Drape of Woven Cloth Using Interacting Particles*, Computer Graphics (SIGGRAPH'94 proceedings), Addison-Wesley, pp 365-372, July 1994 represent cloth as a lattice of particles with forces between them represented as springs. These are the main cloth simulation methods. There have been various developments for each method, and P. Volani and N. Magnenat-Thalmann (2000), *Virtual Clothing: Theory and Practice*, Springer-Verlag 2000 presents an overview and also gives a state of the art cloth dynamics and clothing system.

In addition to the above-described cloth-dynamics approaches, there are also slow geometric methods for fitting clothes which do not take physics into account but use the geometry of the avatar as a basis for transforming the clothing, as described in, for example, B. K. Hinds and J. McCartney (1990), *Interactive Garment Design*, The Visual Computer, Springer-Verlag, 6, pp 53-61, and H. N. Ng, R. L. Grimsdale and W. G. Allen (1995), *A System for Modelling and Visualization of Cloth Materials*, Computers and Graphics, Pergamon Press/Elsevier Science, 19(3), pp 423-430.

In this same field, US2001/0026272A1 also describes a system and method for designing a wear article for a virtual three-dimensional model object, wherein a wear article can be displayed on the object by comparing three-dimensional data relating to the article and the object to determine the non-intersection thereof. The shape of the wear article is then conformed to the shape of the object using data relating to a material type of the article, which specifies how the wear article may stretch, flex, sag etc. on the virtual model object to better approximate the real-life look and fit of the article.

Outside of the specific field of virtual clothing models WO 01/08102 discloses a computer aided design system for designing geometric objects, which utilizes computational techniques for blending between geometric objects, wherein weighted sums of points on the geometric objects are used in deriving a new blended geometric objects. In a similar vein, U.S. Pat. No. 6,094,202 describes a method of generating new animated objects from a database of existing objects, by selecting those existing objects with the required features for blending together to produce the new object. The extent to which a selected object is incorporated into the new object may be selected by the animator by assigning each selected object with a weight; the new object is then a sum of each of the differences between each of the selected objects and a base object multiplied by the respective weights.

From a review of the above it should be apparent that whilst the dynamic physical simulation of cloth dynamics can produce very good cloth simulation results, the computational intensity required to perform dynamic cloth-dynamics simulations is exceptionally high, and is unsuitable for many consumer level general purpose computers or other processing devices such as personal digital assistants or mobile phones. Furthermore, the computation required is also too high to achieve good performance from server computers running an on-line shopping application, and which may receive many requests for an avatar clothing model from different users in a relatively short time frame. Therefore, in order to overcome this problem, an alternative cloth modelling method is required which is of reduced computational intensity, but which achieves results of substantially similar quality to the existing cloth-dynamics simulation methods.

BRIEF SUMMARY

In order to meet the above problem, the present invention provides for a new avatar (for example corresponding to a user and generated in an avatar booth such as those provided by BTexact Technologies and described in *Personal Virtual Humans: Inhabiting The Talk Zone and Beyond*, Daniel Ballin et al, BT Technology Journal, Kluwer, January 2002) to be projected onto a database of avatar prototypes. This gives a new representation of the avatar as a set of weights on this database. These weights can be used to sum the prototypes to produce a new mesh representation of the avatar. A parallel database of clothes prototypes is produced to that of the database of avatar prototypes. Clothing for the new avatar is then produced by summing over the database of clothes prototypes using the same weights as for the avatar prototypes.

However, the methods and systems provided by the invention to perform the above can also be applied much more generally to object models other than avatars, and in particular the invention may be of use in any situation where an object model of a first type needs to be represented as set of weights relating to a library of predefined object models of the first type, thus giving a compact object model representation. Moreover, the compact representation of the set of weights can then be used to generate object models of a second type from a library of predefined object models of a second type. Thus, a bespoke object model of a second type can be generated which corresponds to or can be used in conjunction with the input object model of the first type.

In view of the above, from a first aspect the present invention provides a method of object model analysis, comprising the steps of:

comparing an object model with a plurality of predefined object models; and on the basis of said comparison, generating a set of weight values expressing the object model as a weighted sum of the plurality of predefined object models.

This allows an object model such as an avatar to be analysed and compared to a database of existing object models, at least some of which and preferably each of which are slightly different, and a set of weights representing the object model with respect to the database to be generated. As the weights can be generated and stored at any time (for example on creation of the first object model), they can be immediately available for use in subsequent computations.

Moreover, the weights themselves can be used to accurately represent the first object model, and hence can be used as a bandwidth efficient representation of the object model if information representing the model is required to be transmitted over a network. In this manner, the analysis method to produce the weights is analogous to a coding scheme for the object model.

From a second aspect, the invention further provides a method of object model generation, comprising the steps of:

obtaining and/or storing a set of weight values expressing a first object model of a first type as a weighted sum of a plurality of predefined object models, each of the first type; and applying the set of weight values to a plurality of predefined models of a second type to generate an output object model of the second type corresponding to a weighted sum of the predefined models of the second type.

In the second aspect the advantage is obtained that an object model of a second type can be generated with relatively little computational intensity, by merely summing according to the obtained or stored weights the predefined object models of the second type. As each of these models are slightly different from each other, the different weightings applied to each model in the summation results in a completely new model being generated.

Moreover, because the set of weight values used to generate the model represent the specific first object model of the first type, a bespoke object model of the second type which substantially corresponds to the first object model is easily produced.

From a third aspect the invention further provides a method of object model analysis and generation, comprising the steps of:

comparing an object model of a first type with a plurality of predefined object models, each of the first type;

on the basis of said comparison, generating a set of weight values expressing the object model as a weighted sum of the plurality of predefined object models of the first type;

applying the set of weight values to a plurality of predefined object models of a second type to generate an output object model of the second type corresponding to a weighted sum of the predefined models of the second type.

In the third aspect the invention provides the advantages as already described for both the first and second aspects.

From a fourth aspect, there is also provided a method of obtaining an object model, comprising the steps of:

transmitting information relating to a first object model of a first type to an object model server; and receiving from the object model server an output object model of a second type generated by applying a set of weight values to a plurality of predefined object models of a second type, the output object model of the second type corresponding to a weighted sum of the predefined models of the second type.

This provides the advantage that a client-server architecture may be supported, in that the client computer transmits a request for an object model of the second type, which is to be generated on the basis of the first object model of the first type. The server may then produce the object model of the second type and transmit the model to the client computer. This arrangement moves the computational load away from the client computer and onto the server.

Moreover, the further advantage is obtained that information relating to the plurality of predefined object models of the second type does not need to be communicated to the client computer in advance in order for it to perform its own object generation, thus saving network bandwidth.

In addition, it is further possible for a number of different sets of predetermined objects of the second type to be provided, and for the object generation to take place with respect to any one of those sets. Preferably, the set to be used is indicated by the user. This allows for multiple different second objects to be generated as required.

Preferably, the transmitted information is a set of weight values expressing the first object model of the first type as a weighted sum of a plurality of predefined object models, each of the first type. This provides the bandwidth efficiency advantages mentioned earlier.

Alternatively, the transmitted information is the first object model itself. This allows all the processing including the weight generation to be performed centrally, thus lightening the load on the user computers even further.

In a further alternative embodiment the transmitted information is merely the identification of the first object model, such as a user ID or the like. In such an embodiment the server already has stored therein either the first object model or the weight set describing the model associated with an identification thereof. This identification may conveniently be the identification of a user who has registered with the server in advance, and provided the first object model or the corresponding weights for storage thereat, the stored object model or weights being in the preferred application of the invention the representation of the user's own avatar. Thus by merely sending the user ID to the server as the transmitted information the server will know which first object model of corresponding set of weights it is to use an input for the generation of the object model of the second type.

In preferred embodiments of the invention, there is further provided the feature of displaying to a user the first object model of the first type simultaneously with the output object model of the second type. This allows, for example, the objects to be displayed overlaid on one another.

In the preferred embodiment of the invention the object models of the first type are avatars, and the object models of the second type are clothing models. This allows for on-line clothes modelling by avatar to be performed.

To facilitate this further, preferably the clothing models are models of clothing garments in the shape which the garments would assume when applied to the avatars.

From a fifth aspect the present invention further provides a computer program so arranged such that when executed on a computer it causes the computer to perform the method of any of the previously described aspects. Moreover, from a sixth aspect, there is also provided a computer readable storage medium arranged to store a computer program according to the fifth aspect of the invention. The computer readable storage medium may be any magnetic, optical, magneto-optical, solid-state, or other storage medium capable of being read by a computer.

In addition to the above, the present invention also provides a system arranged to operate in accordance with the above described methods. Therefore, from a seventh aspect there is provided a system for object model analysis, comprising:

object comparison means for comparing an object model with a plurality of predefined object models; and weight generation means for, on the basis of said comparison performed by said object comparison means, generating a set of weight values expressing the object model as a weighted sum of the plurality of predefined object models.

In addition, from an eighth aspect there is also provided a system for object model generation, comprising:

means for obtaining and/or storing a set of weight values expressing a first object model of a first type as a weighted sum of a plurality of predefined object models, each of the first type; and model generation means arranged in operation to apply the set of weight values to a plurality of predefined models of a second type to generate an output object model of the second type corresponding to a weighted sum of the predefined models of the second type.

Moreover, according to a ninth aspect the invention also provides a system for object model analysis and generation, comprising:

object comparison means for comparing an object model of a first type with a plurality of predefined object models, each of the first type;

weight generation means for, on the basis of said comparison performed by said object comparison means, generating a set of weight values expressing the received object model as a weighted sum of the plurality of predefined object models of the first type; and model generation means arranged in operation to apply the set of weight values to a plurality of predefined object models of a second type to generate an output object model of the second type corresponding to a weighted sum of the predefined models of the second type.

Finally, in a tenth aspect there is provided a system for obtaining an object model, comprising:

transmission means for transmitting information relating to a first object model of a first type to an object model server; and receiver means for receiving from the object model server an output object model of a second type generated by applying a set of weight values to a plurality of predefined object models of a second type, the output object model of the second type corresponding to a weighted sum of the predefined models of the second type.

Each of the seventh, eighth, ninth and tenth aspects may possess the same further features and provide the same advantages as respectively described previously in respect of the first, second, third and fourth aspects.

Further features and advantages will be apparent from the claims.

BRIEF DESCRIPTION OF THE DRAWINGS

Moreover, additional features and advantages of the present invention will become apparent from the following description of an embodiment thereof, presented by way of example only, and made with reference to the accompanying drawings, wherein like reference numerals refer to like parts, and wherein.

DESCRIPTION OF EMBODIMENTS OF THE INVENTION

A general description of the hardware which may be used as the operating environment of the embodiments of the invention will be described first, followed by specific description of the operation of each individual embodiment.

Figure 1:
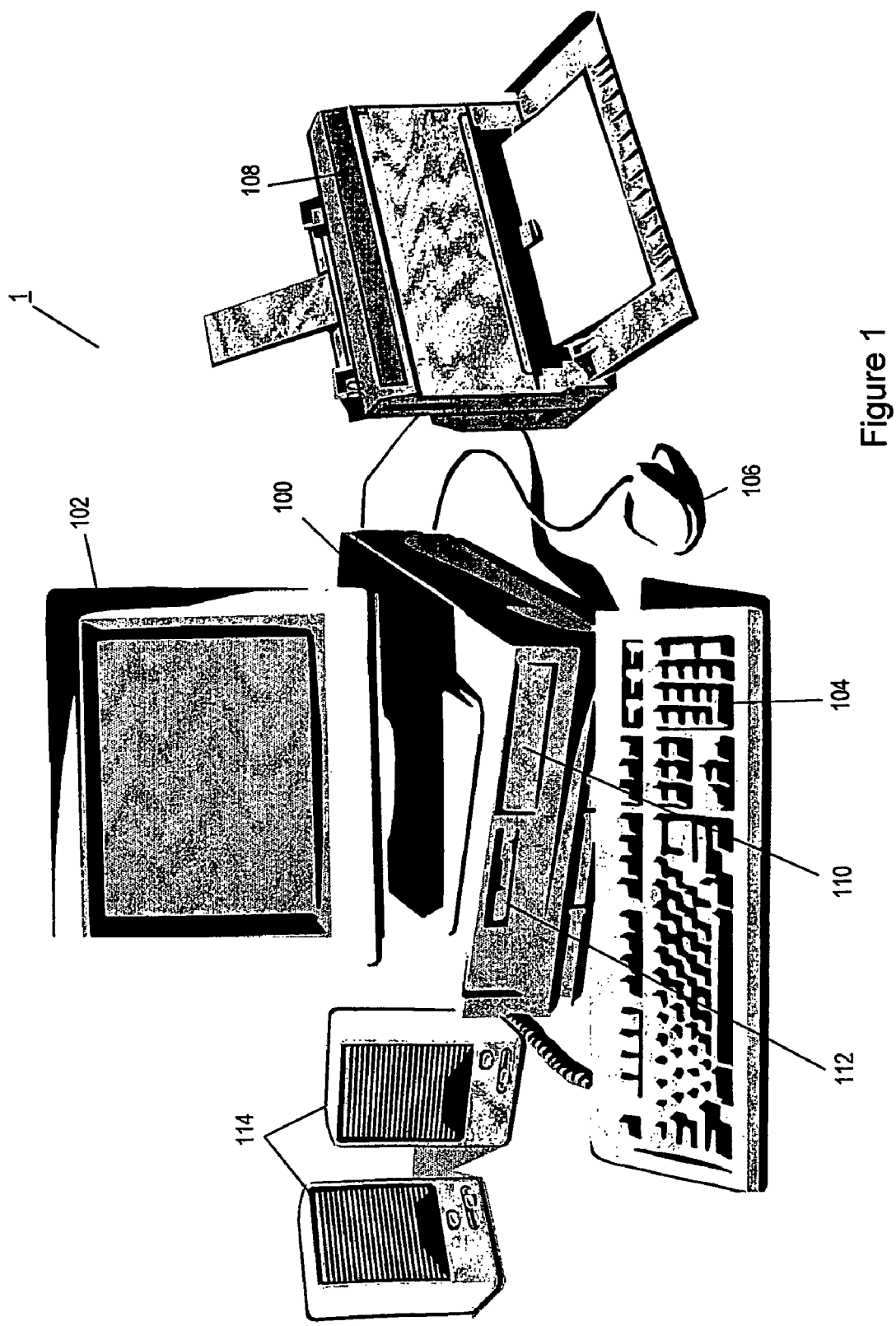
FIG. 1 is an illustration showing a general purpose computer which may form a basis of the embodiments of the present invention.

FIG. 1 illustrates a general purpose computer system which provides the operating environment of embodiments of the present invention. In particular such a general purpose computer may form the operating environment for both a client computer and a server computer in a client-server architecture. Later, the operation of the invention will be described in the general context of computer executable instructions, such as program modules, being executed by a computer. Such program modules may include processes, programs, objects, components, data structures, data variables, or the like that perform tasks or implement particular abstract data types. Moreover, it should be understood by the intended reader that the invention may be embodied within other computer systems other than those shown in FIG. 1, and in particular hand held devices, notebook computers, main frame computers, mini computers, multi processor systems, distributed systems, etc. Within a distributed computing environment, multiple computer systems may be connected to a communications network and individual program modules of the invention may be distributed amongst the computer systems.

With specific reference to FIG. 1, a general purpose computer system 1 which may form the operating environment of an embodiment of the invention, and which is generally known in the art comprises a desk-top chassis base unit 100 within which is contained the computer power unit, mother board, hard disk drive or drives, system memory, graphics and sound cards, as well as various input and output interfaces. Furthermore, the chassis also provides a housing for an optical disk drive 110 which is capable of reading from and/or writing to a removable optical disk such as a CD, CDR, CDRW, DVD, or the like. Furthermore, the chassis unit 100 also houses a magnetic floppy disk drive 112 capable of accepting and reading from and/or writing to magnetic floppy disks. The base chassis unit 100 also has provided on the back thereof numerous input and output ports for peripherals such as a monitor 102 used to provide a visual display to the user, a printer 108 which may be used to provide paper copies of computer output, and speakers 114 for producing an audio output. A user may input data and commands to the computer system via a keyboard 104, or a pointing device such as the mouse 106.

It will be appreciated that FIG. 1 illustrates an exemplary embodiment only, and that other configurations of computer systems are possible which can be used with the present invention. In particular, the base chassis unit 100 may be in a tower configuration, or alternatively the computer system 1 may be portable in that it is embodied in a lap-top or notebook configuration.

Figure 2:
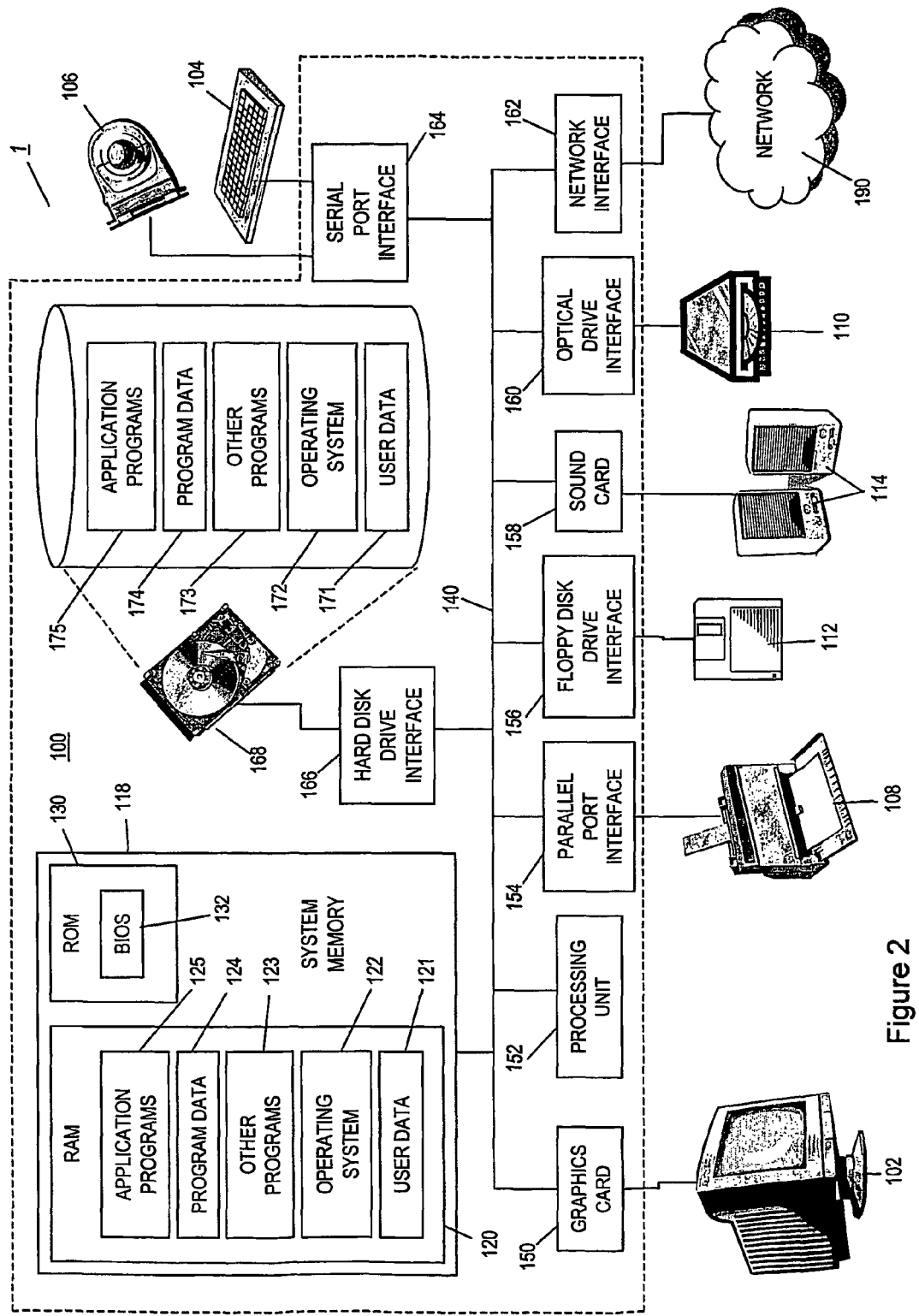
FIG. 2 is a schematic block diagram showing the various system elements of the general purpose computer of FIG. 1.

FIG. 2 illustrates a system block diagram of the system components of the computer system 1. Those system components located within the dotted lines are those which would normally be found within the chassis unit 100.

With reference to FIG. 2, the internal components of the computer system 1 include a mother board upon which is mounted system memory 118 which itself comprises random access memory 120, and read only memory 130. In addition, a system bus 140 is provided which couples various system components including the system memory 118 with a processing unit 152. Also coupled to the system bus 140 are a graphics card 150 for providing a video output to the monitor 102; a parallel port interface 154 which provides an input and output interface to the system and in this embodiment provides a control output to the printer 108; and a floppy disk drive interface 156 which controls the floppy disk drive 112 so as to read data from any floppy disk inserted therein, or to write data thereto. In addition, also coupled to the system bus 140 are a sound card 158 which provides an audio output signal to the speakers 114; an optical drive interface 160 which controls the optical disk drive 110 so as to read data from and write data to a removable optical disk inserted therein; and a serial port interface 164, which, similar to the parallel port interface 154, provides an input and output interface to and from the system. In this case, the serial port interface provides an input port for the keyboard 104, and the pointing device 106, which may be a track ball, mouse, or the like.

Additionally coupled to the system bus 140 is a network interface 162 in the form of a network card or the like arranged to allow the computer system 1 to communicate with other computer systems over a network 190. The network 190 may be a local area network, wide area network, local wireless network, or the like. In particular; IEEE 802.11 wireless LAN networks may be of particular use to allow for mobility of the computer system. The network interface 162 allows the computer system 1 to form logical connections over the network 190 with other computer systems such as servers, routers, or peer-level computers, for the exchange of programs or data.

In addition, there is also provided a hard disk drive interface 166 which is coupled to the system bus 140, and which controls the reading from and writing to of data or programs from or to a hard disk drive 168. All of the hard disk drive 168, optical disks used with the optical drive 110, or floppy disks used with the floppy disk 112 provide non-volatile storage of computer readable instructions, data structures, program modules, and other data for the computer system 1. Although these three specific types of computer readable storage media have been described here, it will be understood by the intended reader that other types of computer readable media which can store data may be used, and in particular magnetic cassettes, flash memory cards, tape storage drives, digital versatile disks, or the like.

Each of the computer readable storage media such as the hard disk drive 168, or any floppy disks or optical disks, may store a variety of programs, program modules, or data. In particular, the hard disk drive 168 in the embodiment particularly stores a number of application programs 175, application program data 174, other programs required by the computer system 1 or the user 173, a computer system operating system 172 such as Microsoft® Windows®, Linux™, Unix™, or the like, as well as user data in the form of files, data structures, or other data 171. The hard disk drive 168 provides non volatile storage of the aforementioned programs and data such that the programs and data can be permanently stored without power.

In order for the computer system 1 to make use of the application programs or data stored on the hard disk drive 168, or other computer readable storage media, the system memory 118 provides the random access memory 120, which provides memory storage for the application programs, program data, other programs, operating systems, and user data, when required by the computer system 1. When these programs and data are loaded in the random access memory 120, a specific portion of the memory 125 will hold the application programs, another portion 124 may hold the program data, a third portion 123 the other programs, a fourth portion 122 the operating system, and a fifth portion 121 may hold the user data. It will be understood by the intended reader that the various programs and data may be moved in and out of the random access memory 120 by the computer system as required. More particularly, where a program or data is not being used by the computer system, then it is likely that it will not be stored in the random access memory 120, but instead will be returned to non-volatile storage on the hard disk 168.

The system memory 118 also provides read only memory 130, which provides memory storage for the basic input and output system (BIOS) containing the basic information and commands to transfer information between the system elements within the computer system 1. The BIOS is essential at system start-up, in order to provide basic information as to how the various system elements communicate with each other and allow for the system to boot-up.

Whilst FIG. 2 illustrates one embodiment of the invention, it will be understood by the skilled man that other peripheral devices may be attached to the computer system, such as, for example, microphones, joysticks, game pads, scanners, or the like. In addition, with respect to the network interface 162, we have previously described how this is preferably a wireless LAN network card, although equally it should also be understood that the computer system 1 may be provided with a modem attached to either of the serial port interface 164 or the parallel port interface 154, and which is arranged to form logical connections from the computer system 1 to other computers via the public switched telephone network (PSTN).

Where the computer system 1 is used in a network environment, it should further be understood that the application programs, other programs, and other data which may be stored locally in the computer system may also be stored, either alternatively or additionally, on remote computers, and accessed by the computer system 1 by logical connections formed over the network 190.

Having described the system architecture of the computer system 1 which forms the hardware of the embodiments of the present invention, specific description of the software modules and data involved in the embodiments of the invention will now be undertaken with respect to FIGS. 3 to 10.

Figure 3:
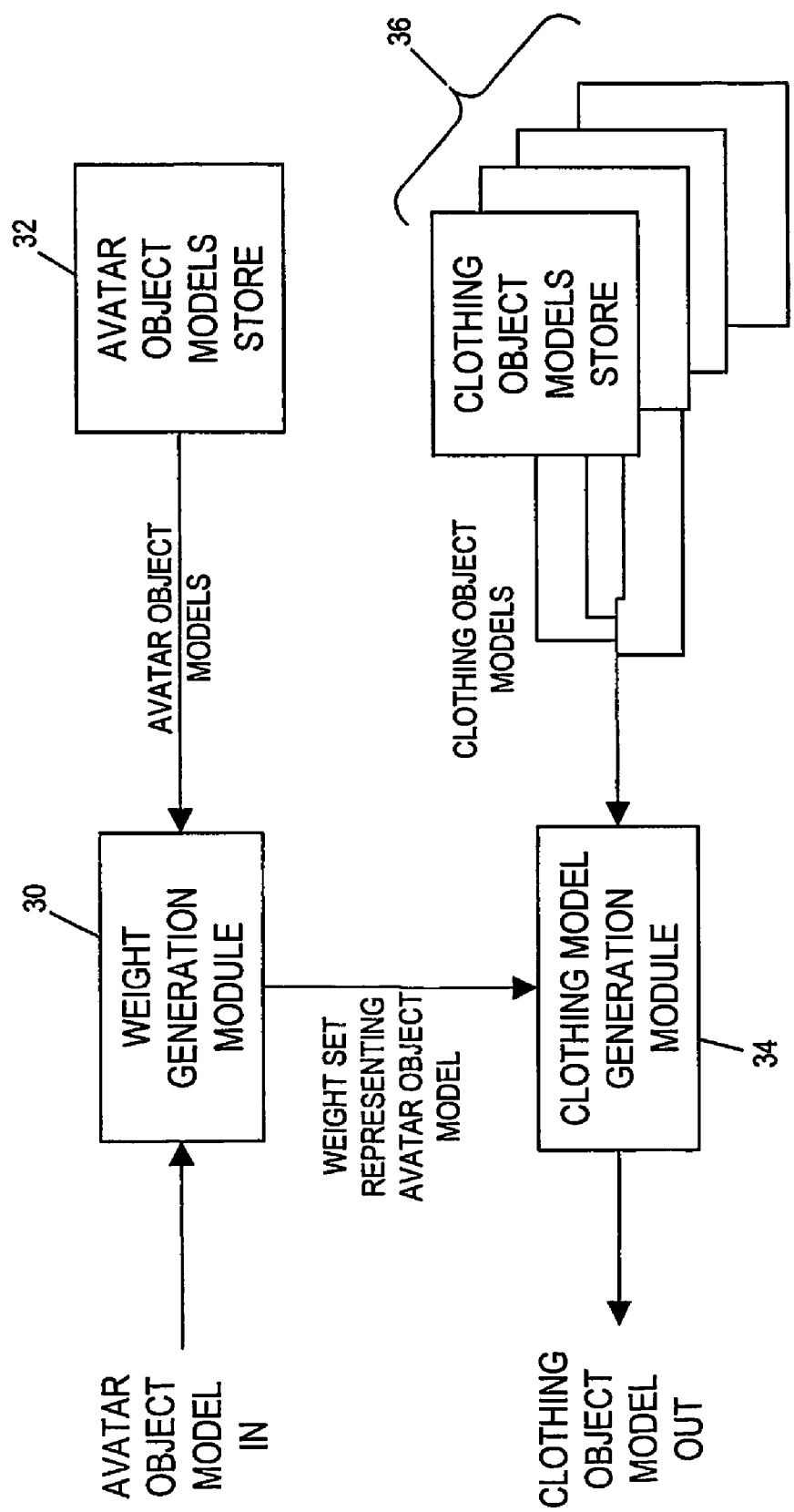
FIG. 3 is a system block diagram showing the various software component modules and data stores, and the data flows therebetween of the embodiments of the present invention.

FIG. 3 is an overall system diagram illustrating the software modules, data stores, and data flows used within the embodiments of the present invention. More particularly, the input to the system in the preferred embodiment is in the form of an avatar object model, which preferably comprises a set of vectors $V=\{X1, Y1, Z1, X2, \ldots, \ldots, Xn, Yn, Zn\}^T$, where the $X_i$, $Y_i$, and $Z_i$ values are the positions of the vertices of the avatar model mesh. These vertices when plotted in a virtual space then form the vertices of polygons which together form a "wire frame" virtual model of a human being. It should be noted here that although in the preferred embodiment we are concerned with the virtual clothing of avatars, the invention in its broadest aspect is not limited to such a use, and in fact any object model of any type may be analysed or created using the techniques of the invention.

The data representing the avatar object model which is to be used as the input to the system is input to a weight generation software module 30 which acts to generate a set of weights w which describes the input avatar object model in relation to a plurality of predefined avatar object models which are stored in an avatar object models store 32. Preferably, the predefined avatar object models have the same mesh topology as the input avatar object model. Moreover, each of the predefined avatar object models is preferably slightly different from each other, and each predefined avatar object model can be considered to be a model prototype in a prototype space. However, in other embodiments some (although not all) of the prototype models may be identical or substantially identical without affecting the overall operation of the invention.

Figure 4:
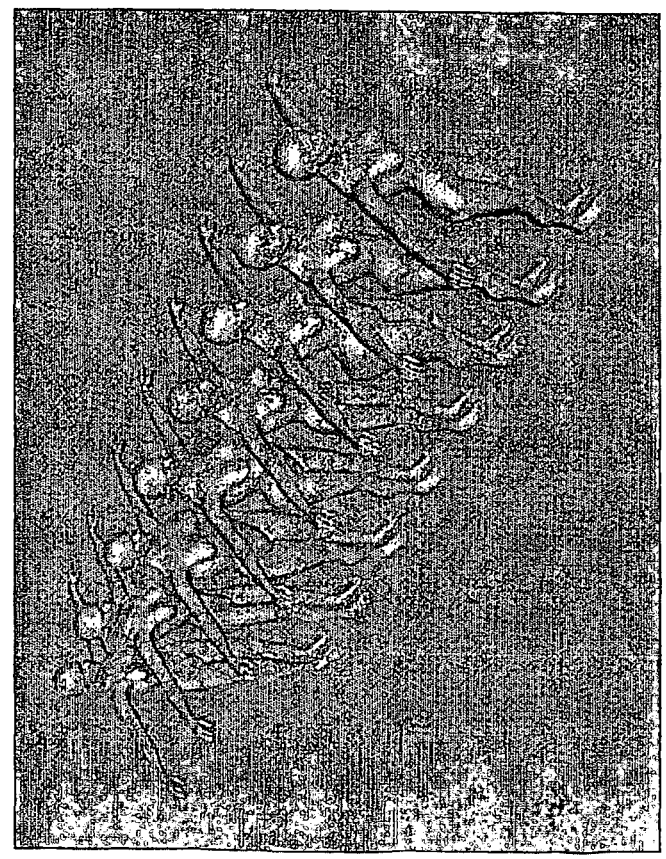
FIG. 4 is a picture illustrating a plurality of predefined avatar object models which are used in the present invention.

The prototype space formed by the plurality of predefined avatar object models in the avatar object model store 32 will be envisaged more clearly by considering FIG. 4, which illustrates a plurality of predefined avatar object models displayed in a virtual space. A visual inspection of the depicted predefined avatar object models will show that each model in this example is slightly different, depicting a different body shape. Where, as in the preferred embodiment described herein, the predefined object models of the first type are avatars, the predefined object models should preferably be chosen so as to represent a broad cross section of human body shapes, from slim builds to heavy builds, and taking into account many different body shapes in between.

The predefined avatar object models stored in the avatar object model store 32 are also input into the weight generation module 30, which performs a comparison of the input avatar object model with the predefined avatar object models from the store 32, so as to generate the set of weights w representing the input avatar object model as a weighted sum of the predefined avatar object models stored in the avatar object model store 32. The set of weights thus generated represents a compact representation of the input avatar object model with respect to the prototype predefined avatar object models. That is, if a computer is provided with the predefined avatar object models as stored in the avatar object models store 32, then given the set of weights w generated by the weight generation module an approximation to the input avatar object model can be created. Thus, the set of weights w generated by the weight generation module can be considered to be a compact encodement of the input avatar object model.

The weight set w generated by the weight generation module 30 and representing the input avatar object model is, in the embodiments of the invention, passed to a clothing model generation module 34, which uses the generated weights to generate a new clothing object model in the preferred embodiment. In other embodiments unrelated to the clothing of avatar objects, the model generation module 34 uses the received weights to generate an object model of a second type.

The clothing model generation module 34 takes as another input a number of clothing object models taken from one of a number of clothing object models stores 36. Each clothing object models store stores a number of clothing object models, being virtual representations of one or more items of clothing depicted in the shape that they would attain when worn by a human (or more specifically, when virtually worn by an avatar). Preferably, an identical respective number of clothing object models are stored in each store to the number of avatar object models in the avatar object models prototype space. Moreover, each of the respective clothing object models depicts what the particular item of clothing would look like when worn by a respective one of the avatar object models from the avatar object models prototype space.

As mentioned above, a plurality of clothing object model stores 36 may be provided in order to allow the system to model more than one item of clothing. Therefore, for example, one clothing object model store 36 may store clothing object model prototypes of a dress, whereas another clothing object model store 36 may store clothing object model prototypes of another item of clothing such as a pair of trousers, a jumper or the like. It should be noted that only one item of clothing will be represented in any one particular clothing object models store, and the clothing object models relating to a particular item of clothing stored in a particular store represent a prototype space of clothing object models, corresponding to the prototype space of the predefined avatar object models stored in the predefined avatar object models store 32.

Figure 5:
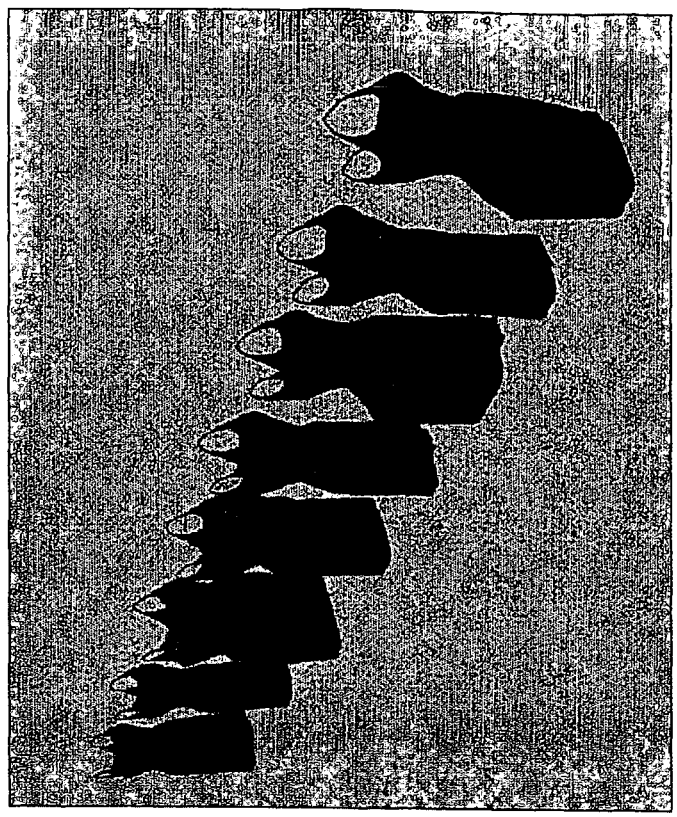
FIG. 5 is a picture of a number of predefined clothing models which are used in the embodiments of the present invention.

FIG. 5 illustrates the above in more detail by showing a prototype space of clothing object models relating to a dress. It will be seen when related to adjacent FIG. 4 that each of the prototype dress models of FIG. 5 corresponds to the shape that would be assumed by such a dress when "worn" by the corresponding avatar model in the avatar model prototype space. That is, the dress that is furthest to the right hand side of FIG. 5 corresponds to the shape which the dress would assume when worn by the avatar at the furthest right hand side of FIG. 4, and so on respectively throughout the avatar and dress models. The clothing object models such as the dress models themselves are created in advance by either simply stretching a generic dress model to fit each predefined object model, or by using a cloth dynamics model as previously described in respect of the prior art to produce more accurate dynamically modelled dress models. By producing the respective clothing object models according to the above, matching respective clothing models to each respective avatar model are produced.

It will be understood that several different object model prototype spaces can be produced for different items of clothing, but that the individual models for each prototype space are produced in the same way, either by stretching a generic clothing item model to match the avatar object models in the avatar object prototype space or by using cloth dynamics models off line in advance. Whichever technique is used, it should be further understood that it is only ever necessary to create each of the clothing object model prototype spaces for each item of clothing once, and that once the clothing object models prototype spaces are created, the data representing the models can be stored in the model stores 36.

As previously mentioned, the clothing module generation module 34 receives the weight set output from the weight generation module 30, and also receives the predefined clothing models from one of the clothing object model prototype spaces stored in one of the clothing object model stores 36. Which particular store is accessed will depend upon which item of clothing (i.e. dress, trousers, jumper, etc etc) it is desired to create a new clothing model thereof. Once the clothing object models for the particular item of clothing have been received by the clothing model generation module 34, the module 34 applies the received set of weights respectively to the clothing object models, to generate a new clothing object model, which is output therefrom. The newly generated clothing object model may then be transmitted to a user for display on a users computer.

The above describes the overall operation of the method and system of the embodiments of the present invention. The entire operation as given in FIG. 3 may be performed by a single computer, although the invention is also particularly suitable for performance in a distributed computing environment where a number of computers communicate over a network. A specific distributed embodiment such as this will now be described with reference to FIG. 6.

Figure 6:
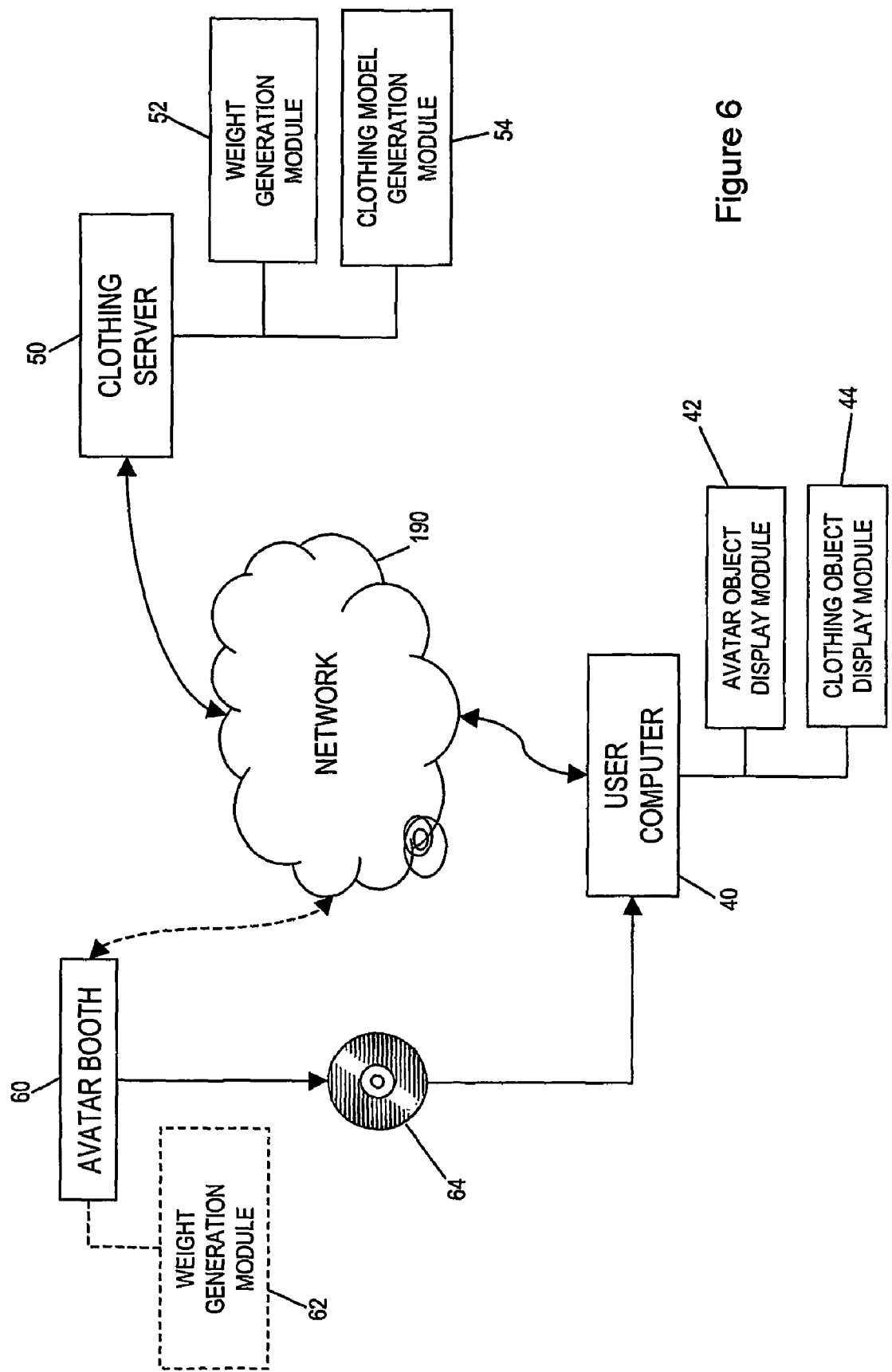
FIG. 6 is a system block diagram illustrating the distribution of the various software modules between the different computers in an embodiment of the present invention.

In FIG. 6, a user computer 40 is provided, which is preferably a general purpose computer 1, such as that previously described with respect to FIGS. 1 and 2. The user computer 40 is provided with an avatar object display software module 42, and a clothing object display software module 44. Both the avatar object display module 42 and the clothing object display module 44 are software programs preferably stored on the hard disk 168 of the user computer, and which are loadable into the system memory as required in order to be executed by the computer.

The user computer 40, being a general purpose computer, is provided with a network interface 162 which may communicate via a network 190 over logical connections with another computer, being a clothing server 50. As with the user computer 40, the clothing server 50 may also be a general purpose computer such as that already described in FIGS. 1 and 2, but running a clothing server application program in order to cause the computer to operate as a clothing server in the manner to be described. The clothing server 50 is provided with two specific software programs, being a weight generation software module 52, and a clothing model generation software module 54. Each of the modules are stored as programs on the hard drive 168 of the clothing server computer, and are loadable into the system memory 118 thereof as required.

In addition to the user computer 40 and the clothing server 50, it is also necessary within the preferred embodiment of the invention to provide some means of generating an avatar object model of the user which is then used as the input object model to the weight generation software module. Within the embodiment herein described this is achieved by the provision of an avatar booth 60 such as those provided by BTexact Technologies, and described in Ballin et al, ibid. The avatar booth 60 acts to scan a user's body and generate an avatar object model thereof. This is then provided to the user either on a computer readable storage media such as a CD-ROM 64 for the user to transport and install on their own user computer 40, or alternatively may be provided in a network transportable mode for the user to download over the network 190 at a later date.

Instead of or in addition to simply providing the user with the complete avatar object model in the form of the mesh co-ordinates, the avatar booth 60 may also be provided with a weight generation module 62 identical to the weight generation module 52 provided at the clothing server 50. The weight generation module 62 analyses the created avatar object model of the user, and generates a set of weights relating the users avatar object model to the predefined avatar object models in the avatar object model prototype space. In order to facilitate this, the avatar booth 60 is also provided with an avatar object store 32 storing the pre-defined avatar object model prototypes, as previously described.

Where the avatar booth 60 is provided with a weight generation module 62, then in addition to providing the user with the actual avatar object model, the avatar booth also provides the associated set of weights generated by the weight generation module 62. The set of weights may be stored on the CD-ROM 64, or be downloadable over the network 190 to the user's computer 40.

Howsoever the user installs the avatar object model created by the avatar booth 60 on the user computer 40, the created avatar object model may be displayed to the user by the avatar object display module 42. There are several known software packages which perform such functions, such as, for example, Silicon Graphics® Open Inventor, or Curious Labs® Poser which is available from Curious Labs Inc., of 655 Capitola Road, Suite 200, Santa Cruz, Calif. 95062.

Assume now that the user wishes to display his avatar object model clothed with an item of clothing. In order to do this, the user computer 40 establishes a logical connection with the clothing server 50 via the network 190. The clothing server 50 may provide browsing functionality in order to allow the user to view the items of clothing for which clothing models are available, and to select an item of clothing for which the user wishes a clothing model corresponding to her own avatar to be generated. In order to achieve such browsing functionality, the user computer 40 may be provided with a standard browser program, such as, for example, Microsoft® Internet Explorer.

In order to cause the clothing server 50 to create a new clothing model, the user computer 40 transmits a request for a clothing model to the clothing server 50, and also transmits data corresponding to the user's avatar object model. This data is received at the clothing server 50 via the network 190, and the received avatar object model is processed by the weight generation module 52 at the clothing server to generate a set of weights w relating the received model to the predefined avatar object models in the avatar object model prototype space. The set of weights is then used by the clothing model generation module 54 to generate a new clothing object model corresponding to the user's avatar and depicting the item of clothing which the user has chosen. The clothing server 50 then transmits the generated new clothing model back to the user computer 40 via the network 190.

At the user computer 40, the received clothing object model is displayed to the user using the clothing object display software module 44. As with the avatar display software model 42, software packages which achieve such display of a virtual model such as the clothing object model are known already, such as, for example, Curious Labs Poser. Whilst the received clothing object model may be displayed by itself to the user, preferably the received clothing object model is displayed simultaneously with the user's avatar object model, and superimposed together such that it appears as if the received clothing object model is being worn by the user's avatar model.

The above description corresponds to the case where the user has not already received a set of weights corresponding to the user's avatar object model from the avatar booth 60. Where a set of weights has been received, however, instead of transmitting the entire user's avatar object model to the clothing server 50, the user computer 40 may instead only transmit the set of weights to the clothing server 50 via the network 190. The clothing model generation module 54 at the clothing server 50 may then directly use the received set of weights to generate the clothing model, which is transmitted back to the user computer 40 in the same manner as before. This is a particularly preferred configuration, as it reduces computational intensity at the clothing server 50 even further, by doing away with the need for the clothing server 50 to operate the weight generation software module 52 to generate the set of weights required as the input to the clothing model generation module 54. This enables the clothing server 50 to process more requests for clothing models from multiple users in any given time frame.

Moreover, FIG. 6 illustrates only one particular embodiment with respect to the distribution of the various software modules required in the embodiments of the present invention. In other embodiments, for example, the user computer 40 might itself be provided with a weight generation module corresponding to the module 52 provided at the clothing server. In addition, the user computer 40 will also be provided with the set of predetermined avatar object models in the prototype space, stored in the avatar object model store 32. The provision of such elements enables the user computer 40 to generate its own set of weights corresponding to the user's avatar model. Other configurations or distributions of software modules are also possible.

For example, in another embodiment not specifically illustrated in the drawings the clothing server 50 may be provided with an object model store and/or an object weight store, which respectively store object models of the first type, being preferably avatar models, or corresponding weight sets to object models. The stored object models or weight sets are avatars (or weight representations thereof) belonging to users who have registered with the server and uploaded their avatar models (or corresponding weight sets) in advance. The server 50 stores the uploaded data in the appropriate store dependent on whether it is an avatar object model or a weight set. Each user's data is indexed in the appropriate store by a unique user ID, which binds the stored data to a particular user. Preferably the server stores weight sets for each user rather than whole avatar models, as weight sets are more compact representations, and hence the data storage capacity is reduced. Moreover, as the weight sets are required for the generation of clothing object models in any case it is computationally more efficient if the clothing server can simply use the stored weight set specific to a user for each clothing object which the user requires to be generates, rather than first having to generate the weight set from the user avatar object model each time.

In operation a registered user can browse a web site hosted on the server which illustrates the various clothing models (dresses, trousers, jumpers, etc. etc.) which are available at the clothing server and which are stored in the various clothing object models stores 36. When the user sees an item of clothing in which she is interested she can request the server via her own user computer 40 and the network 190 to generate a bespoke clothing model of the item of clothing using the stored user avatar object model or weight set which was previously stored with the server when the user registered. The server can then use the stored user avatar object model or corresponding weight set to generate a bespoke clothing object model for the user in the same manner as described in respect of the other embodiments described herein.

The advantage of the above described embodiment where the clothing server 50 stores user avatar models or weight sets in advance is that of bandwidth efficiency, in that the user computer 40 need not transmit either the user avatar model or corresponding weight set to the clothing server 50 over the network every time the user requests a bespoke clothing model object to be generated, but need only transmit the user ID to specify which avatar model or weight set already stored at the server should be used.

The specific operation of the weight generation module 30 (52 in the embodiment of FIG. 6) will now be described with reference to FIG. 7. Note that the operation of the module to perform the function of weight generation is the same regardless of in which of the specific embodiments described earlier it is employed.

Figure 7:
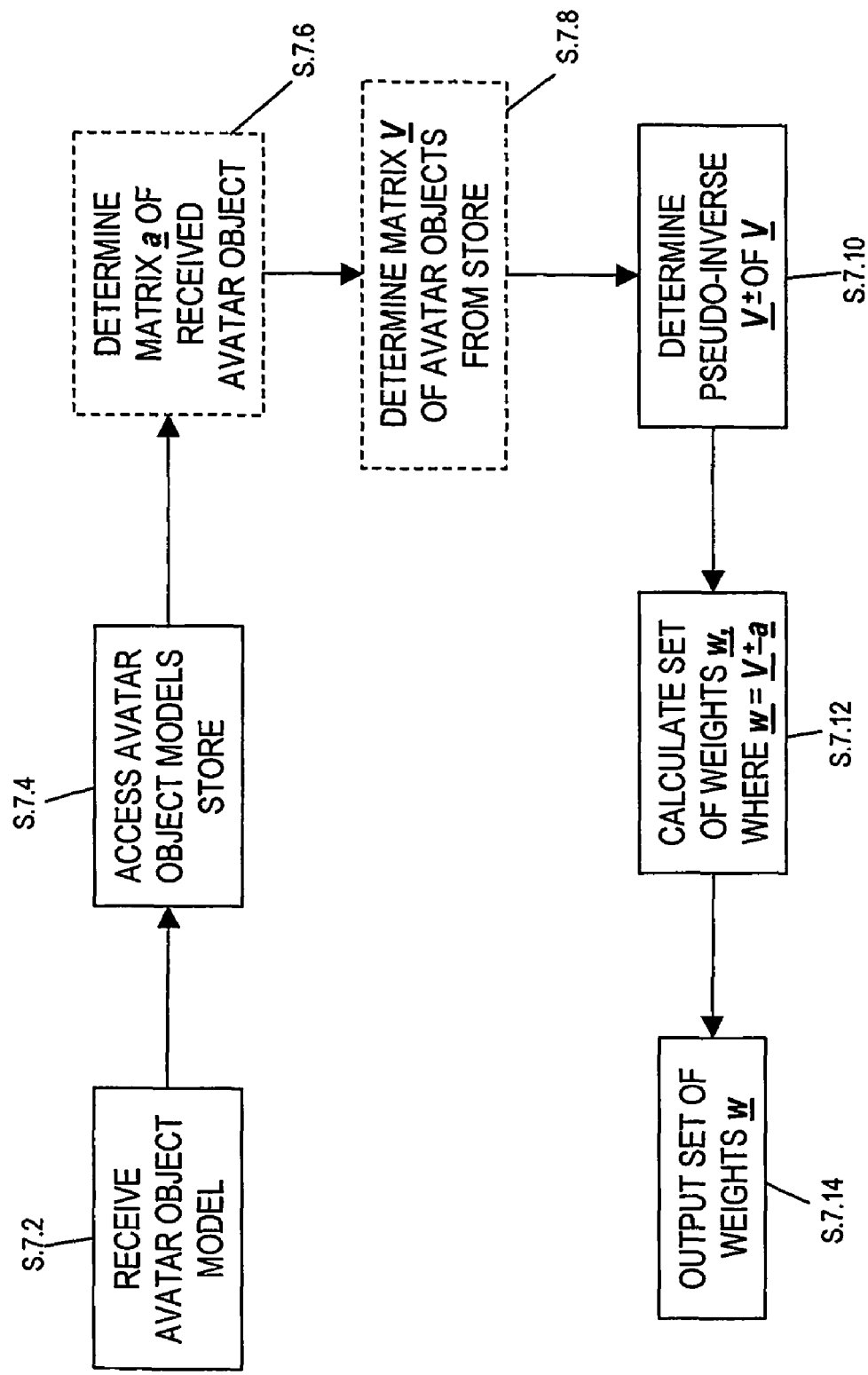
FIG. 7 is a flow diagram relating to the steps involved in the generation of a set of weights to describe an avatar object model in the embodiments of the present invention.

In FIG. 7, at step 7.2 the weight generation module 30 receives the avatar object model for which it is to calculate a set of weights relating thereto. Next, at step 7.4 the module accesses the avatar object models store 32, and reads therefrom information concerning the plurality of predefined avatar object models in the prototype space stored therein. Next, at step 7.6 the module acts to determine a matrix a of the received avatar object model. This step 7.6 is only performed if the received data relating to the input avatar object model is not already in a matrix format, but in some other representative format. The step is performed to place the data into a matrix format in order to ease the calculations required later in the process. If the received data is already in a matrix format then step 7.6 is not performed.

Next, at step 7.8 a matrix $\underline{V}$ is determined which incorporates the vertices coordinates of every predefined avatar object in the avatar object model store 32. As with step 7.6, the step 7.8 is only performed if the predefined avatar object model information in the avatar object models store 32 is not already in a matrix format.

Having obtained matrix formats of the input avatar object model, and the predefined avatar object models, it is then necessary to find corresponding points on the input avatar object model to the predefined avatar object models. In our preferred embodiment this is made easier by using identical mesh topologies between the received input avatar object model and the predefined avatar object models. It is then necessary, however, to try and relate the input avatar object model $\underline{a}$ to the predefined avatar object models represented by the matrix of $\underline{V}$ according to a set of weights $\underline{w}$ in order to give a least squares error. In matrix form this is given by:—

$$\underline{V}\underline{w}=\underline{a} \qquad \text{Equation 1}$$

This is a linear algebra problem, but unfortunately the problem is over-determined in that there are more vertices in the avatar object meshes than predefined avatar object models. A least squares solution can, however, be found using the "pseudo-inverse" of the predefined avatar object model matrix $\underline{V}$. For over-determined systems the pseudo-inverse of a matrix $\underline{V}$ is defined as:—

$$\underline{V}^{+}=(A^{T}A)^{-1}A^{T} \qquad \text{Equation 2}$$

In view of the above, the least squares solution to [1] can be calculated as:—

$$\underline{w}=\underline{V}^{+}\underline{a} \qquad \text{Equation 3}$$

In view of the above, at step 7.10 the weight generation module 30 determines the pseudo inverse of V in accordance with the above equation 2. Then, at step 7.12 the module calculates a set of weights w, using equation 3 as set out above.

Finally, at step 7.14 the determined set of weights w is output from the module.

In an alternative but related method to the above it is not necessary to calculate the precise pseudo-inverse as outlined above, but instead applying various partial manipulation operations to the matrix that produce the same result as the inverse. In particular Gaussian elimination and LU decomposition can be used, which are methods for finding a standard inverse solution and are used instead of the inverse component of the psuedo-inverse. The psuedo-inverse solution of Eq 3 above instead becomes:—

$$y = V^T a$$

$$w = LUdecomposeSolution(V^T V, y)$$

where the function LudecomposeSolution is an LU decomposition function, such as are well known in the art. LU decomposition in general is discussed and algorithms given for its implementation in the C programming language, on pages 43-50 of *Numerical Recipes in C: The Art of Scientific Computing*, Cambridge University Press, 1992, ISBN 0-521-43108-5, the disclosure of which necessary for understanding the above is incorporated herein by reference. A suitable LU decomposition function written in the C programming language specifically for finding the inverse of a matrix is shown on page 48, ibid.

It should be noted that the above described operations are performed by the weight generation module 30 when installed either on the clothing server 50 as the weight generation module 52, or at the avatar booth 60 as the weight generation module 62. Furthermore, where the user computer 40 is provided with a weight generation module, the operation is likewise the same.

Figure 8:
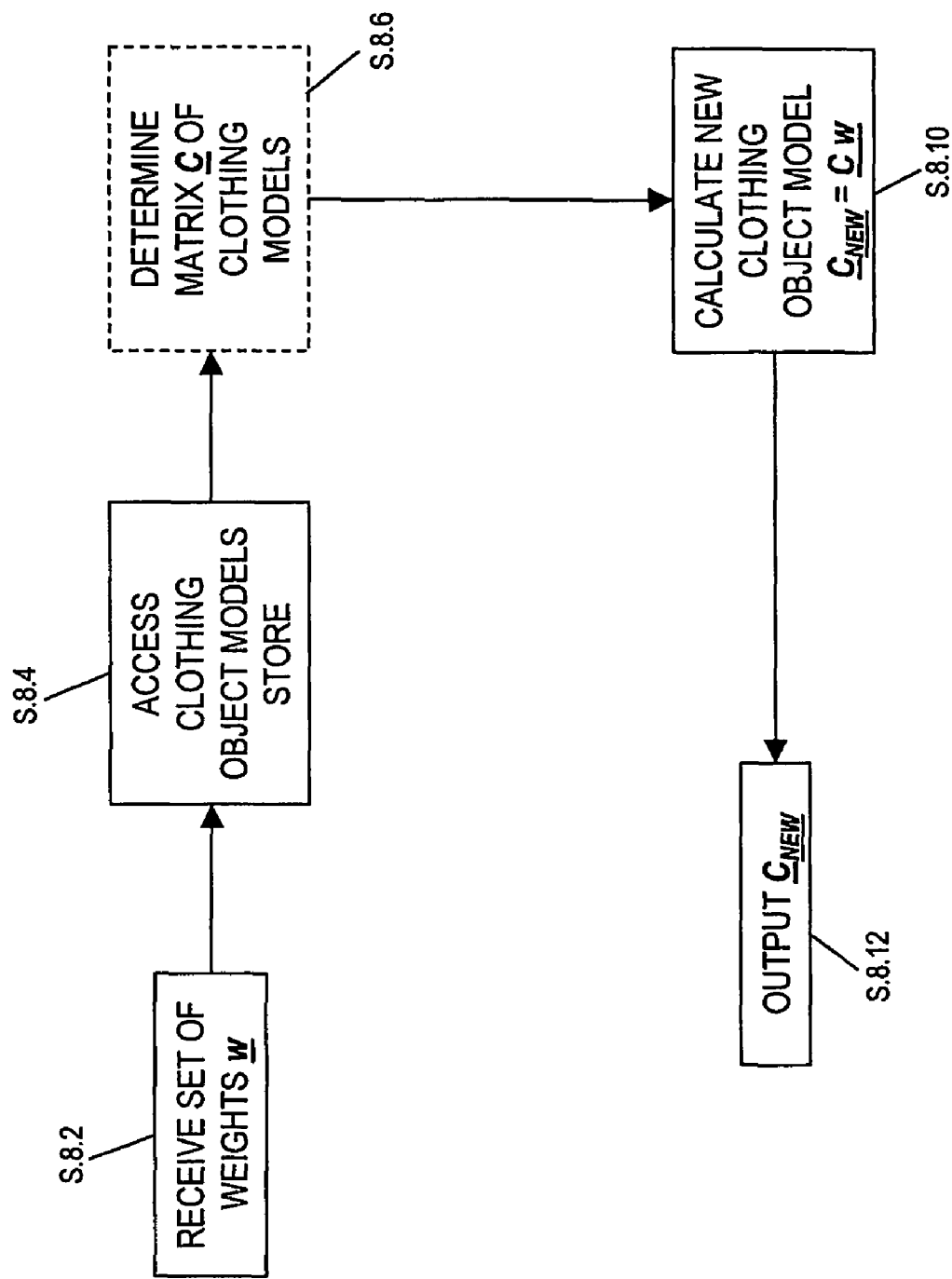
FIG. 8 is a flow diagram illustrating the steps involved in the generation of a new clothing object model in the embodiments of the present invention.

Whereas the set of weights w output from the weight generation module may simply be stored and used as a low bandwidth and compact representation of the input avatar object model, the primary purpose of the set of weights in the present invention is to enable the clothing model generation module 34 (54 in the embodiment of FIG. 6) to generate clothing object models in accordance with user requests. FIG. 8 illustrates the steps formed by the clothing model generation module 34 in performing this task.

With reference to FIG. 8 at step 8.2 the clothing model generation module 34 receives the set of weights w. These may be received directly from the weight generation module 30, or may be created in advance and stored in one of the computers. Having received the set of weights w, at step 8.4 the clothing model generation module 34 accesses one of the clothing object models stores 36 and retrieves the data stored therein relating to the predefined clothing object models for a particular item of clothing.

Next, at step 8.6 the data representing the predefined clothing of object models is converted into a matrix format if it is not already stored in such a form, to give a matrix C containing the vertex coordinates of the respective meshes of the clothing object models.

Having achieved the above, a new clothing object model can then be simply calculated by summing the predefined object models according to the respective weights in the received set of weights w. Thus, where $C_i$ represents the mesh vertex coordinates of the i-th member of the set of predefined clothing models, and $w_i$ represents the respective weight for that model, a new clothing object model can be found using:—

$$C = \Sigma w_i C_i \qquad \text{Equation 4}$$

In matrix form this becomes:—

$$C_{NEW} = Cw \qquad \text{Equation 5}$$

In terms of computational complexity, the above is a relatively cheap process. The complexity is O(N×M) where N is the number of prototype predefined clothing object models, and M is the number of vertices in each model. The complexity can be reduced further by optimising this process by reducing both M and N. In particular, principle component analysis can be used to identify the most important basis vectors, and the ones that contribute least can be excluded from the space of clothing prototypes. Performing the method of the invention on a selection of vertices and interpolating the rest can also reduce the number of vertices in a mesh. Moreover, the basic operations involved in the calculation are also computationally cheap, just a multiply and an addition for each of the X, Y, and Z components. Thus the method of the invention compares favourably with the cloth dynamic algorithms of the prior art.

At step 8.10 the clothing model generation module performs the above calculations to generate a new clothing object model, which in matrix form is represented by $C_{NEW}$. Then, at step 8.12 the clothing object generation module 34 outputs the new clothing object model. In the embodiment of FIG. 6, as previously described the clothing server 50 transmits the new generated clothing object model to the user computer 40 over logical connections formed via the network 190.

The above description concentrates on the preferred embodiments of the invention relating to the generation of clothing object models for on-line avatar clothing applications. However, the full scope of the techniques presented by the invention are much broader, and can be applied to more than just clothing for avatars. In fact, the invention is suitable for any problem that can be expressed as adapting one object to another. The object to be adapted to is represented as part of a prototype space. A parallel space of objects to be adapted is then produced by adapting these to each of the prototypes. Summing this second space with the weights from the first space produces the new adapted object.

In view of this, other possible applications of the invention will be in producing stylised or cartoonish avatars, or in performing motion retargeting. Stylised avatars could be produced by having a space of stylised avatars parallel to the space of avatars. The prototype stylised avatars could be hand-produced by an artist, and hence be changed to give different styles for different animations. A user could use conventional avatar scanning technology to produce an avatar of themselves, and then this standard avatar can be used as a first object to create a more appealing stylised avatar (a second object) from the stylised prototype set.

As mentioned, motion retargeting may also be performed using the invention. The motion may be produced or retargeted for each prototype body shape, and adapted to a new avatar using the techniques of the invention. This may be particularly useful in multiplayer on-line 3D games, where a small set of basic motions need to be retargeted to a very large number of avatars.

Figure 9:
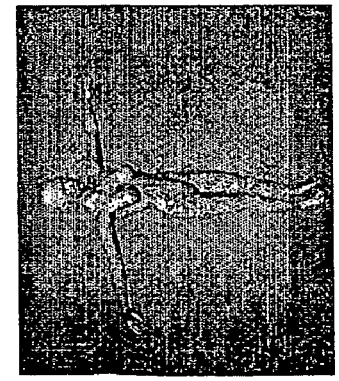
FIG. 9(a) illustrates a user avatar model used by the embodiments of the present invention.
FIG. 9(b) illustrates a front view of the avatar model of FIG. 9(a) when clothed with a new clothing model generated by the present invention.
FIG. 9(c) illustrates a back view of the avatar shown in FIG. 9(b)
Figure 9:
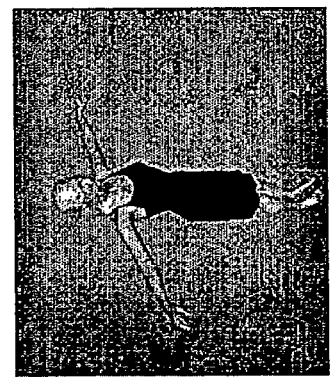
Figure 9:
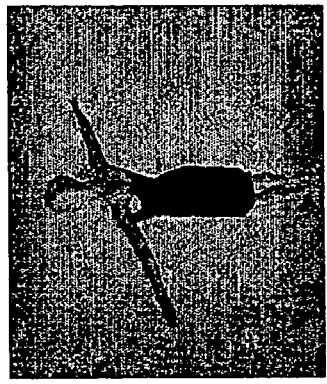
Figure 10:
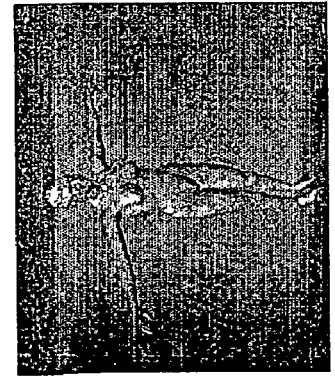
FIG. 10(a) illustrates a second user avatar model used by the embodiments of present invention.
FIG. 10(b) illustrates the avatar model of FIG. 10(a) when clothed with a new clothing model as generated by the embodiments of the present invention.
FIG. 10(c) illustrates a back view of the clothed avatar of FIG. 10(b).
Figure 10:
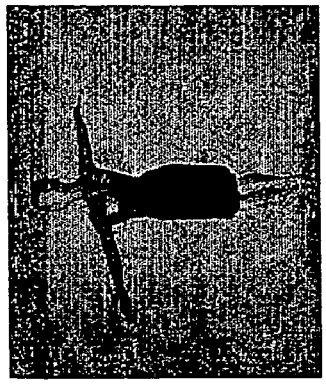

The results obtainable by the use of the present invention are illustrated in FIGS. 9 and 10, which respectfully show two different example results. FIG. 9(*a*) illustrates a user's avatar shown naked with no clothing thereon. FIG. 9(b) illustrates a clothing object model which has been generated according to the invention, displayed at the same time as the avatar and co-located therewith, such that it appears as if the avatar is wearing the clothing object. Likewise, the FIG. 9(c) illustrates a back view of the avatar wearing the new clothing object model.

In FIG. 10, the same sequence of images is shown, but this time with a different avatar, and hence a different generated clothing model. From FIG. 10(a) it will be seen that the avatar shown therein is of much heavier build than that of FIG. 9(a) and this is reflected in the clothing object model generated, and depicted in FIGS. 10(b) and (c). That is, in order to compensate for the much larger avatar model of FIG. 10(a) the clothing object model generated by the embodiment of the invention has been generated so as to fit over the larger avatar model of FIG. 10(a).

As described previously, the results of FIGS. 9 and 10 can be achieved at the user computer 40 by using the avatar object display module 42 to display the avatars, and the clothing object display module 44 to display the clothing objects. It will be understood by those skilled in the art, however, that although we have described these as separate modules herein, in practice they may be the same software application, such as, Curious Labs Poser.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

What is claimed is:

1. A method of object model generation, said method comprising:
   a) receiving a set of values, a, representing a received first object model;
   b) storing a set of weight values, w, expressing the received first object model of a first type as a weighted sum of a plurality of predefined object models, each of the first type, wherein the object models of the first type comprise an avatar, such that
   $w=V^{\pm}a$, wherein $V^{\pm}$ is the pseudo-inverse of V, V representing the vertex coordinates of the plurality of predefined object models;
   c) applying the set of weight values w to a plurality of predefined models of a second type, wherein the object models of the second type comprise clothing models, to generate an output object of the second types corresponding to a weighted sum, $c_{NEW}$, of the predefined models of the second type wherein the output object model of the second type comprises a model of clothing garments in the shape which the garments would assume when applied to the avatars, wherein
   said applying includes calculating $c_{NEW}=c\ w$, wherein c represents the vertex coordinates of the respective meshes of the predefined models of the second type; and
   d) displaying to a user an avatar represented by the first object model of the first type simultaneously with an article of clothing represented by said output object model of the second type.

2. The method according to claim 1, wherein the object models of the first or second type each comprise a plurality of co-ordinates representing vertex points in a virtual space.

3. The method according to claim 1, further comprising:
   transmitting information relating to a first object model of a first type to an object model server after step b) and before step c).

4. The method according to claim 3, wherein the transmitted information is the first object model itself.

5. A computer readable storage medium storing computer program which when executed on a computer causes the computer to perform a method comprising:
   a) receiving a set of values, a, representing a received first object model;
   b) storing a set of weight values, w, expressing the received first object model of a first type as a weighted sum of a plurality of predefined object models, each of the first type, wherein the object models of the first type comprise an avatar, such that
   $w=V^{\pm}a$, wherein $V^{\pm}$ is the pseudo-inverse of V, V representing the vertex coordinates of the plurality of predefined object models;
   c) applying the set of weight values w to a plurality of predefined models of a second type, wherein the object models of the second type comprise clothing models, to generate an output object of the second types corresponding to a weighted sum, $c_{NEW}$, of the predefined models of the second type wherein the output object model of the second type comprises a model of clothing garments in the shape which the garments would assume when applied to the avatars, wherein
   said applying includes calculating $c_{NEW}=c\ w$, wherein c represents the vertex coordinates of the respective meshes of the predefined models of the second type; and
   d) displaying to a user an avatar represented by the first object model of the first type simultaneously with an article of clothing represented by said output object model of the second type.

6. A system for object model generation, said system comprising a program controlled computer including:
   means for receiving a set of values, a, representing a received first object model;
   means for storing a set of weight values, w, expressing the received first object model of a first type as a weighted sum of a plurality of predefined object models, each of the first type, wherein the object models of the first type are avatars, such that
   $w=V^{\pm}a$, wherein $V^{\pm}$ is the pseudo-inverse of V, V representing the vertex coordinates of the plurality of predefined object models;
   model generation means arranged in operation to apply the set of weight values w to a plurality of predefined models of a second type, wherein the object models of the second type are clothing models, to generate an output object model of the second type corresponding to a weighted sum, $c_{NEW}$, of the predefined models of the second type wherein the output object model of the second type comprises a model of clothing garments in the shape which the garments would assume when applied to the avatars, wherein
   $c_{NEW}=c\ w$, wherein c represents the vertex coordinates of the respective meshes of the predefined models of the second type; and
   display means for displaying to a user an avatar represented by the first object model of the first type simultaneously with an article of clothing represented by said output object model of the second type.

7. The system according to claim 6, wherein the object models of the first or second type each comprise a plurality of co-ordinates representing vertex points in a virtual space.

* * * * *